Patented Nov. 6, 1934

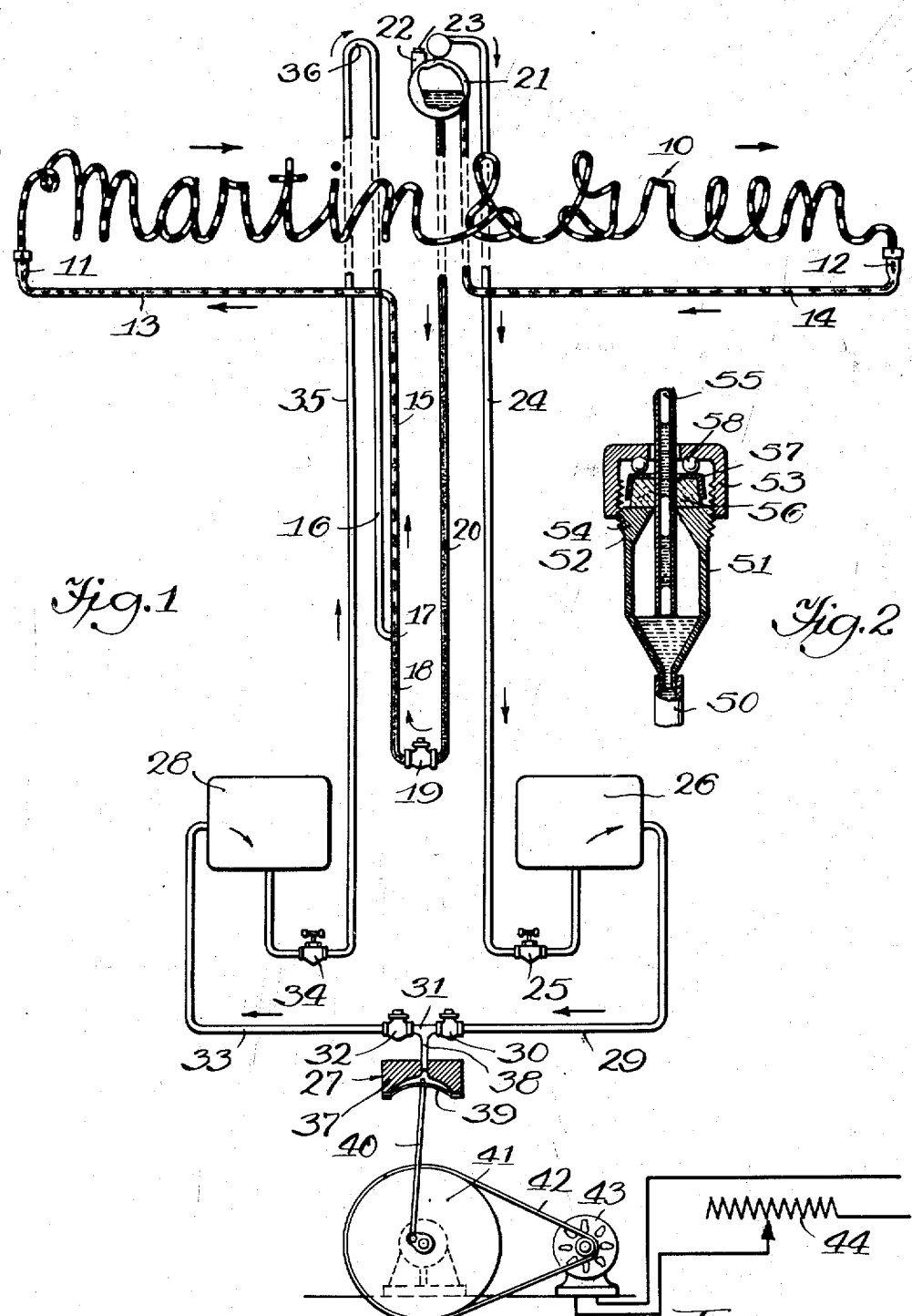

1,979,336

UNITED STATES PATENT OFFICE 1,979,336

DISPLAY DEVICE

William McKinley Martin and Jesse R. Green, Bozeman, Mont.

Application April 6, 1933, Serial No. 664,717

9 Claims. (Cl. 40—125)

The present invention relates generally to advertising or display devices, and in particular to transparent means or forms in which liquid in motion is visible as the attractive feature. It has special reference to glass tubing in a circuit in which colored liquid flows, and in which flow alternate sections of liquid and gas. The invention also relates to means for producing a suitable flow of liquid or color in the display part of the device.

It is well known that motion is attractive to the eye, and hence it is a desirable characteristic of display devices which are intended to attract attention. The present invention employs the motion of moving liquid to attract attention, and provides means to move or circulate liquid, and to break up a circulating liquid into separated sections in order to increase the noticeability of the motion, and to enhance its attractive effect.

A general object of the invention is the provision of display means in which moving liquid is visible.

Another object of the invention is the provision of display means in which immiscible fluids, such as a gas and a liquid, both in motion, are visible.

A particular object of the invention is the provision of a tubular member of transparent material through which liquid is moved or alternate sections of immiscible fluids are moved.

Another particular object of the invention is the use of a gas as one of the immiscible fluids, and the provision of means to arrange the gas and liquid in alternate sections for travel through a transparent tube.

Still another object is the provision of a self-contained and sealed unit of liquid and gas, having various mechanical features for the convenience of its construction, its operation, or its alteration.

Various other and ancillary objects and advantages of the invention will be apparent from the following description of the invention as illustrated for the purpose of explaining its nature, by the device shown in the accompanying drawing, in which:

Fig. 1 is a drawing of the preferred form of device using gas and liquid in a sealed unit.

Fig. 2 is a detailed view in cross-section of a suitable connector for securing the ends of a glass display tube.

It is to be understood that the invention is not limited to the particular form of device or combination, or the particular method specifically described. Numerous changes and modifications in both process and apparatus are contemplated as falling within the scope of the appended claims.

The invention in its broadest aspect consists in attracting attention to a device by the use of moving liquid, preferably a colored liquid, or by the use of moving immiscible fluids visible within a transparent member. The motion may be ordered or disordered. One method of producing either ordered or disordered motion is by introduction of one of two immiscible contrasting fluids into the other, in such a way as to produce motion. A colored water may be taken as an example of one fluid for which air or other gas, an oil, or even mercury may be used as an immiscible contrasting fluid for introduction therein. We prefer to use air and therefore explain the invention by reference to the use of air. In consequence the apparatus which we are about to describe is specifically designed for use of air. It may be modified for other fluids.

Disordered motion may be effected with air, for example by simply bubbling air into the liquid. Because air is the lighter of the fluids it will rise. Whatever fluids are chosen will of course be mixed in accordance with the tendencies to move. We prefer an ordered motion and effect this by means to control the time and amount of one fluid which is introduced into the other. By designing the apparatus for having continuous motion in one direction we produce a device in which there passes a regular procession of alternate sections of the two fluids, for example air and liquid. We also provide means to separate the two fluids and to circulate each in the system. We have two circulating systems which overlap in part to include the display device and a separator in the common portions.

The exemplary device shown in the drawing illustrates how the invention is carried out in practice using continuous ordered motion in a glass tube with air and a colored liquid. The display device proper is represented herein by a glass tube 10 of sufficiently small diameter to maintain a meniscus of fluid, and to preserve moving columns of liquid and gas. The tube may be worked into a letter form in the manner well known for neon signs. Coupling means are provided at the free ends of the tubes which may be metal fixtures 11 and 12 connected respectively to metal piping 13 and 14. Pipe 13 is herein employed as the feeding line for alternate sections of fluids. It has a vertical section 15 into which leads another conduit 16 at a junction point 17. The part of pipe 15 below the junction is designated 18 and it supplies liquid only to the junction. Pipe 16 supplies the other fluid, such as air, to the junction. By controlling the rate of supply of the two fluids the character of the motion and the appearance may be varied.

The liquid supply line 18 has a check valve 19 therein to prevent back flow into the line 20 which leads to a separator 21. Outflow pipe 14 discharges the liquid and gas into the separator 21 which may be elevated above the display device as shown, although this elevation is not essential. Where air is used as one fluid a vent 22 may be employed in the separator, and be opened to the air.

The separator is merely an enlarged chamber in which the succession of fluid sections from the display tube 10 may separate by gravity. When air and liquid are used, the liquid settles in the separator. The separator preferably has a capacity sufficient to hold all the liquid necessary for operating the device, in order to eliminate all danger of overflow through the vent 22.

The vent 22 may be closed, and preferably is, in order to make the system a closed one, and to eliminate bleeding, loss of liquid by evaporation, and the introduction of dirt or dust. Vent 22 is shown closed by a stopper 23, which may be removed for passage of liquid, as in filling or emptying.

Because the system is desirably sealed the air or gas circulated in the device is drawn from the separator. Air pipe 24 leads from the top of the separator 21 to a control valve, such as needle valve 25, to a reservoir 26 wherein sufficient reserve of the gaseous fluid is stored. This may be eliminated if desired, using the capacity of the various conduits for the purpose. It is preferred to use such a reservoir because of the use in the system being described of an impulse-type of air pump 27, which tends to evacuate reservoir 26 and to compress air in a second reservoir 28. Conduit 29 leads from reservoir 26 to a check valve 30 on one side of the impulse motor 27 to a connection 31, thence through check valve 32 and conduit 33 to reservoir 28. Air compressed in reservoir 28 is released through a control valve, such as needle valve 34, into conduit 35 which forms with conduit 16 an inverted U-bend 36, terminating above the level of liquid in the separator 21. The U-bend may be dispensed with, but it is desirable as a protection against flow of liquid into the air delivery system 16—35—34. It thus protects the needle valve 34.

Any type of gas pressure motor may be used, but for convenience and simplicity a diaphragm-type is shown. This has a recessed body 37 connected by conduit 38 to connection 31 between the check valves 30 and 32. The recess of the body is closed by a pliable diaphragm 39 which is oscillated into and out of the recess by the short strokes of the pitman 40 on a large rotary disc 41. To operate the disc a variable speed motor may be employed. Belt 42 over the disc is operated by electric motor 43, the speed of which may be controlled by rheostat 44.

Since the system may be sealed, and in preferred form may have glass tubing sealed to metal tubing, a suitable connection is illustrated which minimizes danger of breaking the glass, while insuring a tight seal.

In Fig. 2 such a device is shown, having metal tube 50 joined to an enlarged casing or head 51 threaded at 52 for receipt of a perforated cap 53. The end of the casing presents an inward flat-topped flange 54 through the center of which extends freely an end of glass tubing 55. A gasket or packing material 56, such as cork, fits snugly over the glass tube and rests on flange 54. A metal cup or other rigid form 57 houses the top and periphery of the packing means, and provides a flat annular bearing surface in cooperation with the interior of the perforated cap 53, for some ball bearings 58. It is particularly designed to provide a well to house a gas pocket in the head 51 in order to keep the liquid from contact with the gasket or packing. For this purpose the packing makes a tight seal, and the free end of the glass projects deeply into the casing. By reason of having such facile connections 11 and 12 it is easy to change or renew the particular display tube 10 which is linked between them.

In operation the device has a supply of liquid, such as a colored solution, or fluorescent dye, in supply separator 21. By gravity it tends to flow down conduit 20, through check valve 19 into pipes 18—15—13, display tube 10, conduit 14, thus filling the entire liquid system and display tube with liquid. Into this circuit, air-pump 27 forces air in amount regulated by pressure in reservoir 28 and by the needle valve 34. Air enters the liquid system at junction 17 and forms an air bubble in pipe 15. Air pressure is releasable only in an upward direction in pipe 15. Consequently a succession of air bubbles breaks the liquid column into alternate sections of air and liquid, which maintain themselves as they pass through the tube 10 if the opening therein is sufficiently small, as preferred. In the event the tubing 10 is too large for maintaining the identity of the sections, there will be an unordered bubbling of liquid and air in the loops and parts of the display tube which will attract attention. Both liquid and air will accumulate in the separator 21. The air is again available for recirculation. Throughout the drawing arrows indicate the directions of flow.

We may use any colored liquid, either a solution or a suspension. Fluorescent or luminescent materials may be present in the liquid. We have used fluorescent dyes and suspended luminescent sulphides. We have used other materials mentioned on page 386, vol. 5, of International Critical Tables. The display device may be illuminated by day light, artificial light, or by any invisible light in which the enclosed circulating material is visible.

It is thus apparent that although I have described air and liquid specifically the device could be operated with immiscible liquids, such as an oil and water, in which different colors may appear in the oil and in the water. The invention is not limited by the present disclosure short of its scope as expressed in the appended claims.

We claim:

1. A display device comprising a transparent display tube, a supply of liquid for said tube, conduit means providing a complete liquid circuit including said tube, a supply of a second fluid immiscible with said liquid, means to introduce said second fluid into said liquid circuit for flow through the display tube, a closed separator for said fluids contained in said liquid circuit for removing said second fluid from the liquid supply, and means connected to said separator for withdrawing the second fluid from said separator and for replenishing the supply of said second fluid.

2. A display device comprising a transparent display tube, a supply of liquid for said tube, conduit means providing a complete liquid circuit including said tube, a supply of gas, means for introducing said gas into said liquid circuit for flow of gas and liquid through said display tube, a closed separator in said liquid circuit for separation of said gas and liquid, and means connected to said separator for withdrawing the gas from said separator and for replenishing the supply of gas.

3. A display device comprising a transparent display tube, a supply of liquid for said tube, conduit means providing a complete liquid circuit including said tube, a supply of a second fluid immiscible with said liquid, conduit means providing a complete fluid circuit including said tube, a separator for said immiscible fluids located in both of said complete circuits as one junction for the common portions of said circuits, means in the fluid circuit to put pressure upon the second fluid, and means to control the release of the compressed second fluid into the liquid circuit at the other junction of the common portions of the circuit.

4. A display device comprising a transparent display tube, a supply of liquid for said tube, conduit means providing a complete liquid circuit including said tube, a supply of gas immiscible with said fluid, conduit means providing a complete gaseous circuit including said tube, a separator for said liquid and gas located in both of said complete circuits as one junction for the common portions of said circuits, means in the gaseous circuit to compress the gas, and means to control the release of gas into said liquid circuit at the other junction of the common portions of said circuits.

5. A display device comprising a transparent display tube, means at one end for supplying two immiscible fluids to said tube, a separator connected to the other end of said tube for separating said fluids, separate fluid connections from said separator to said supply means for separately conducting said two fluids, and forcing means in one of said connections for circulating the fluid therein, whereby each of said fluids are moved through the display tube.

6. A display device comprising a transparent display tube, means at one end for supplying liquid to said tube, means for bubbling an immiscible gas into said supply of liquid for forming gas and liquid bodies flowing through said tube, a separator connected to the other end of said tube for separating the liquid and the gas, a connection for liquid between said separator and said liquid supply means, means for the conduct of gas from the separator for return to the gas bubbling means, and means to close the gas and liquid passages from the atmosphere.

7. A display device comprising a transparent display tube, means at one end for supplying liquid to said tube, a supply of a gas immiscible with said liquid, means for bubbling said gas into said liquid supply for forming a flow of gas and liquid bodies through said tube, a separator connected to the other end of said tube for separating the liquid and the gas, a connection for liquid between said separator and said liquid supply means, a connection for gas from said separator to said supply of gas, and a gas pump in said connection for circulating said gas, whereby to cause flow of gas and liquid through said tube.

8. A display device comprising a transparent display tube, means to cause two immiscible fluids to flow in alternating bodies through said display tube, means to separate said fluids after flow through said tube, separate connections from said separating means for each of said fluids to return each to the first mentioned means, and sealing means to close the fluid containers from the atmosphere whereby to form a closed system.

9. A display device comprising a transparent display tube, a supply of liquid and a supply of gas for said tube, means to provide in sequence alternate bodies of said liquid and gas for flow through said tube, a separator for receiving the liquid and gas from said tube, and means connected to said separator for conducting the separated components back to said supplying means.

WILLIAM McKINLEY MARTIN.
JESSE R. GREEN.

CERTIFICATE OF CORRECTION.

Patent No. 1,979,336.   November 6, 1934.

WILLIAM McKINLEY MARTIN, ET AL.

It is hereby certified that error appears in the printed specification of the above numbered patent requiring correction as follows: Page 3, line 20, claim 3, strike out the word "compressed"; and that the said Letters Patent should be read with this correction therein that the same may conform to the record of the case in the Patent Office.

Signed and sealed this 8th day of January, A. D. 1935.

(Seal)

Leslie Frazer
Acting Commissioner of Patents.

cuit including said tube, a supply of gas, means for introducing said gas into said liquid circuit for flow of gas and liquid through said display tube, a closed separator in said liquid circuit for separation of said gas and liquid, and means connected to said separator for withdrawing the gas from said separator and for replenishing the supply of gas.

3. A display device comprising a transparent display tube, a supply of liquid for said tube, conduit means providing a complete liquid circuit including said tube, a supply of a second fluid immiscible with said liquid, conduit means providing a complete fluid circuit including said tube, a separator for said immiscible fluids located in both of said complete circuits as one junction for the common portions of said circuits, means in the fluid circuit to put pressure upon the second fluid, and means to control the release of the compressed second fluid into the liquid circuit at the other junction of the common portions of the circuit.

4. A display device comprising a transparent display tube, a supply of liquid for said tube, conduit means providing a complete liquid circuit including said tube, a supply of gas immiscible with said fluid, conduit means providing a complete gaseous circuit including said tube, a separator for said liquid and gas located in both of said complete circuits as one junction for the common portions of said circuits, means in the gaseous circuit to compress the gas, and means to control the release of gas into said liquid circuit at the other junction of the common portions of said circuits.

5. A display device comprising a transparent display tube, means at one end for supplying two immiscible fluids to said tube, a separator connected to the other end of said tube for separating said fluids, separate fluid connections from said separator to said supply means for separately conducting said two fluids, and forcing means in one of said connections for circulating the fluid therein, whereby each of said fluids are moved through the display tube.

6. A display device comprising a transparent display tube, means at one end for supplying liquid to said tube, means for bubbling an immiscible gas into said supply of liquid for forming gas and liquid bodies flowing through said tube, a separator connected to the other end of said tube for separating the liquid and the gas, a connection for liquid between said separator and said liquid supply means, means for the conduct of gas from the separator for return to the gas bubbling means, and means to close the gas and liquid passages from the atmosphere.

7. A display device comprising a transparent display tube, means at one end for supplying liquid to said tube, a supply of a gas immiscible with said liquid, means for bubbling said gas into said liquid supply for forming a flow of gas and liquid bodies through said tube, a separator connected to the other end of said tube for separating the liquid and the gas, a connection for liquid between said separator and said liquid supply means, a connection for gas from said separator to said supply of gas, and a gas pump in said connection for circulating said gas, whereby to cause flow of gas and liquid through said tube.

8. A display device comprising a transparent display tube, means to cause two immiscible fluids to flow in alternating bodies through said display tube, means to separate said fluids after flow through said tube, separate connections from said separating means for each of said fluids to return each to the first mentioned means, and sealing means to close the fluid containers from the atmosphere whereby to form a closed system.

9. A display device comprising a transparent display tube, a supply of liquid and a supply of gas for said tube, means to provide in sequence alternate bodies of said liquid and gas for flow through said tube, a separator for receiving the liquid and gas from said tube, and means connected to said separator for conducting the separated components back to said supplying means.

WILLIAM McKINLEY MARTIN.
JESSE R. GREEN.

CERTIFICATE OF CORRECTION.

Patent No. 1,979,336.  November 6, 1934.

WILLIAM McKINLEY MARTIN, ET AL.

It is hereby certified that error appears in the printed specification of the above numbered patent requiring correction as follows: Page 3, line 20, claim 3, strike out the word "compressed"; and that the said Letters Patent should be read with this correction therein that the same may conform to the record of the case in the Patent Office.

Signed and sealed this 8th day of January, A. D. 1935.

(Seal)

Leslie Frazer
Acting Commissioner of Patents.